United States Patent [19]
Cook et al.

[11] 4,124,801
[45] Nov. 7, 1978

[54] APPARATUS AND PROCESS FOR SEPARATING MATERIALS

[75] Inventors: Leslie J. Cook, Pasadena; Alvin T. Forrester, Beverly Hills; John F. Mahoney, South Pasadena; Julius Perel, Altadena; Kenneth E. Vickers, Sierra Madre, all of Calif.

[73] Assignee: Phrasor Technology Incorporated, Pasadena, Calif.

[21] Appl. No.: 726,298

[22] Filed: Sep. 24, 1976

[51] Int. Cl.² ............................................. B01D 59/44
[52] U.S. Cl. .................................... 250/288; 250/281; 250/423 R
[58] Field of Search ...................... 250/423 F, 281, 288

[56] References Cited
U.S. PATENT DOCUMENTS 2,727,150  12/1955  Lawrence .............................. 250/281
3,996,469  12/1976  Janes .................................... 250/281

OTHER PUBLICATIONS

"Electrohydrodynamic Ion Source", by Mahoney et al., Journal of Applied Physics, vol. 40, No. 13, Dec. 1969, pp. 5101–5106.

Primary Examiner—Harold A. Dixon
Attorney, Agent, or Firm—Harris, Kern, Wallen & Tinsley

[57] ABSTRACT

Apparatus and method for separating materials, particularly isotopes of heavy metals. An electrohydrodynamic source of positive ions directed in a beam to a transverse magnetic field which deflects the ions along paths which carry the different mass ions to different collectors. An ion source incorporating a container for molten material, a pressure system for delivering the liquid material to a capillary tube, and a high voltage power supply providing an intense electrostatic field at the tube end for producing ions by field emission.

29 Claims, 11 Drawing Figures

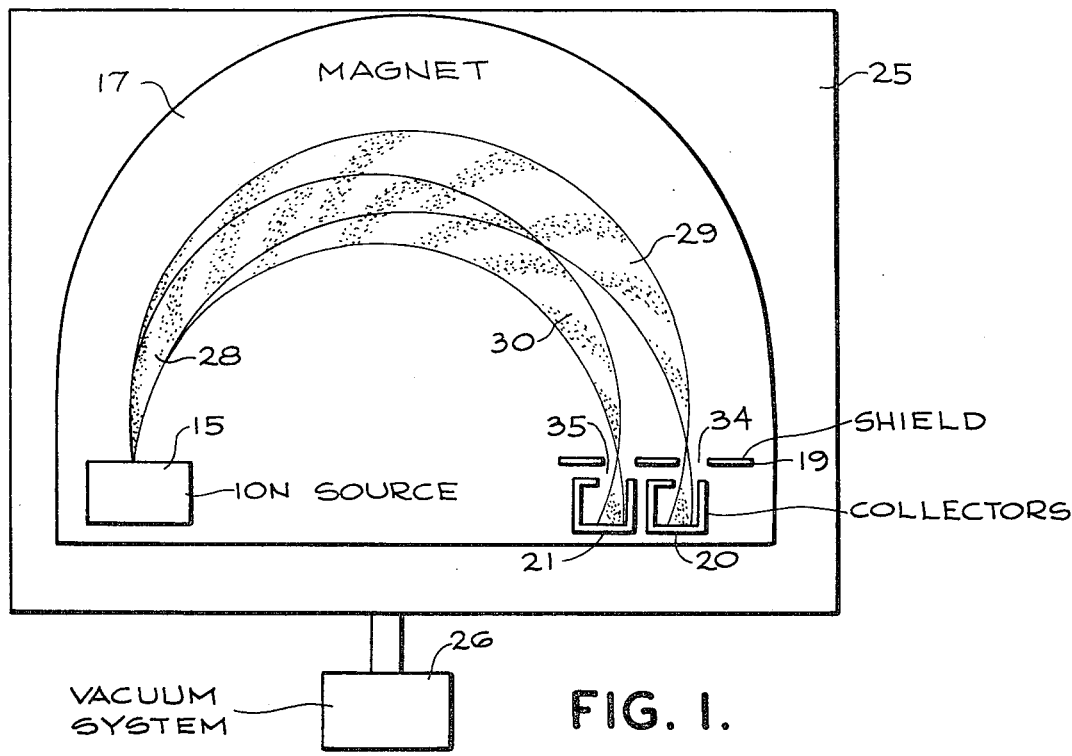
FIG. 1.
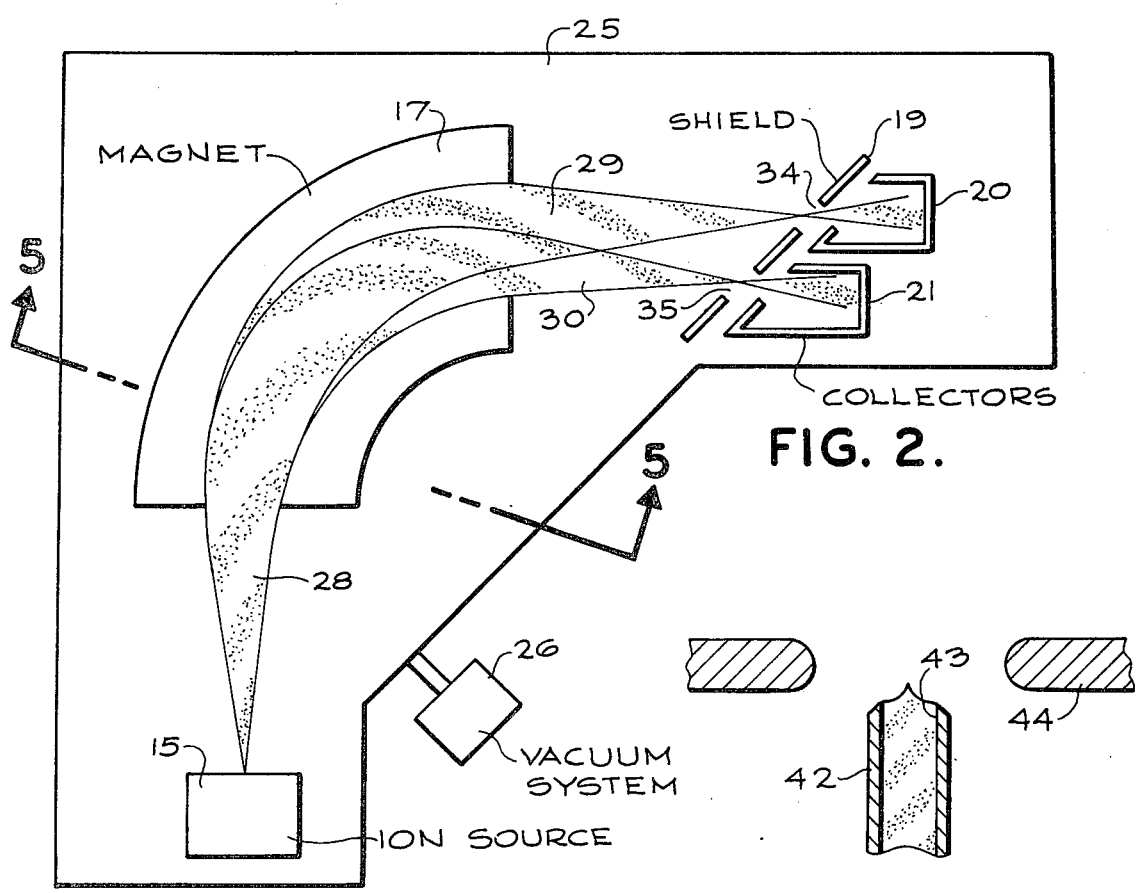
FIG. 2.
FIG. 4.

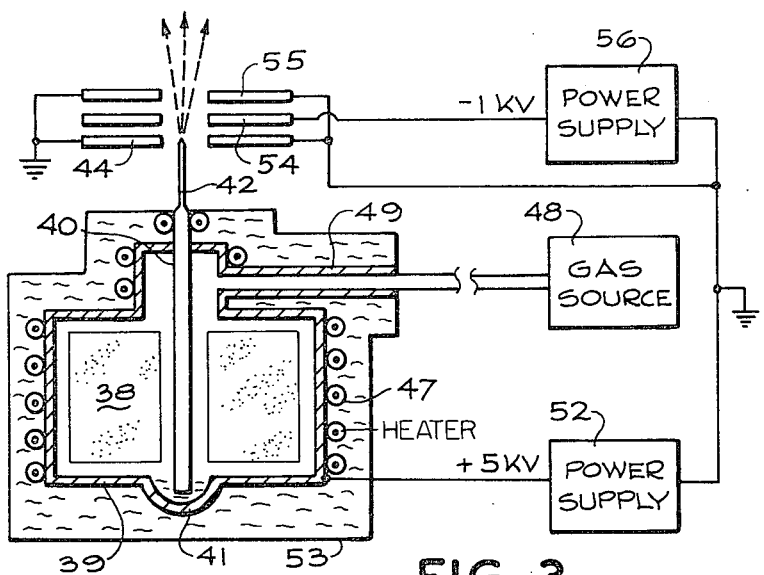
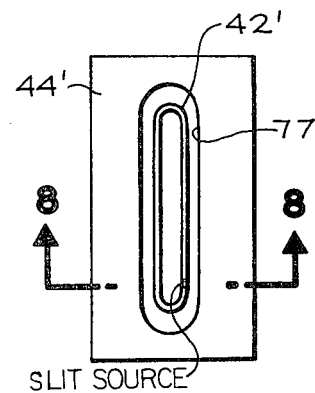
FIG. 3.
FIG. 7.
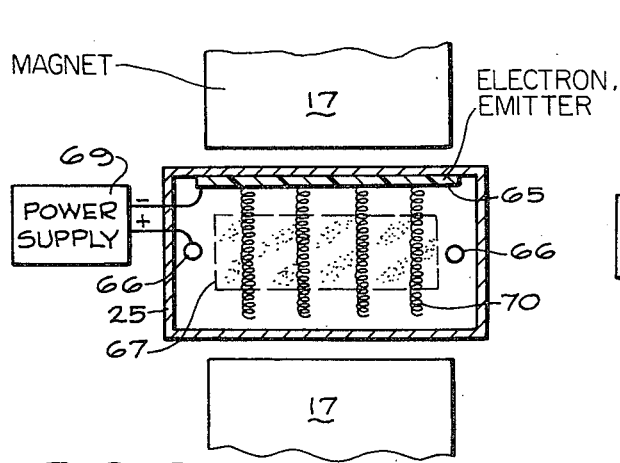
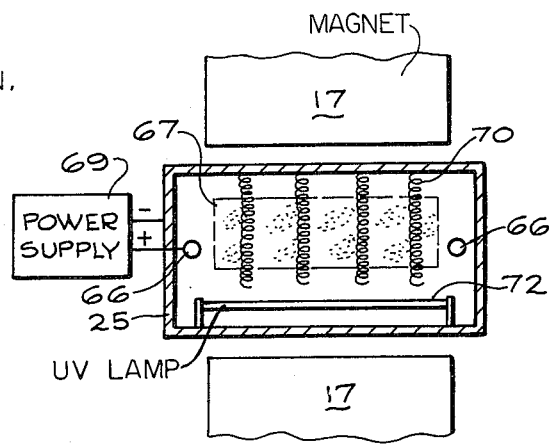
FIG. 5.
FIG. 5a.
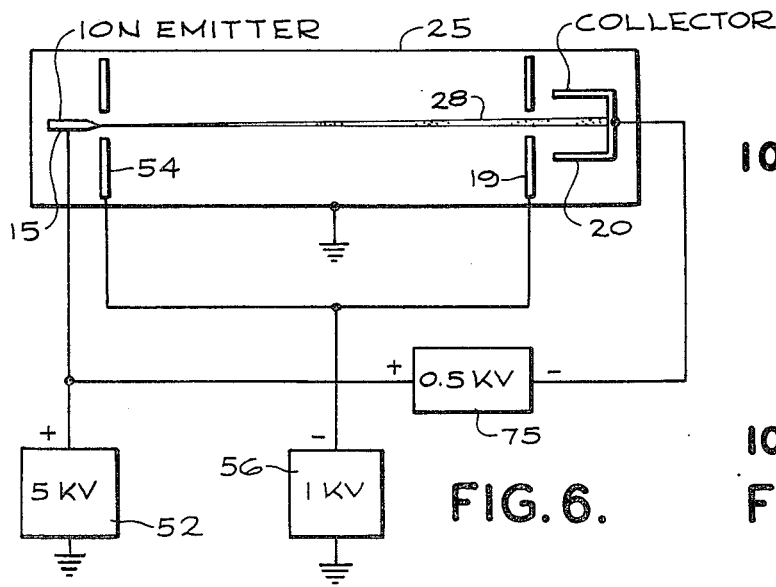
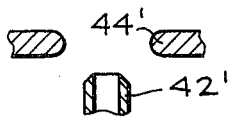
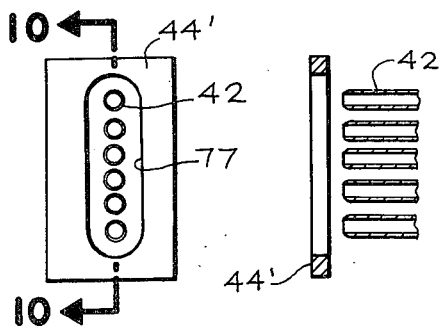
FIG. 6.
FIG. 8.
FIG. 9.
FIG. 10.

APPARATUS AND PROCESS FOR SEPARATING MATERIALS

BACKGROUND OF THE INVENTION

This invention relates to the separation of materials and in particular, to new and improved methods and apparatus suitable for separation of isotopes of heavy metal in relatively large quantities at relatively low cost.

An important use for methods and apparatus of this type is in the production of uranium 235 by separation of uranium 235 from its isotope uranium 238. The methods and apparatus are sometimes used in the separation of uranium 235 from a mixture of the isotopes, and sometimes in the enrichment of such a mixture by increasing the percentage of uranium 235 present in the mixture. A number of techniques have been considered and/or utilized in the separation of isotopes of heavy metals, including gaseous diffusion, centrifuge enriching, and laser isotope separation.

In all uranium enrichment techniques being pursued the problem is that $^{235}U$ and $^{238}U$ differ little in mass. They do not easily lend themselves to separation by mass differences in gaseous diffusion unless catalysts are introduced and then separated by distillation. This process of catalyst addition and then separation adds expense. Gaseous diffusion, an inherently inefficient process, requires a large volume facility and this is very expensive. The laser separation technique takes advantage of the difference between the excitation levels of $^{235}U$ and $^{238}U$ by using a laser to excite $^{235}U$ to a level so that it can be easily ionized with further radiation or preferentially reacted with a catalyst. Problems with this process involve the need for an atomic vapor which requires a high temperature corrosion resistant system. Also needed is a high power laser for large scale operation and this is an inherently low efficiency operation. If catalysts are used, the separating cost is an additional expense. Laser separation is also critically dependent upon spectral absorption cross section of $^{235}U$ which is uncertain. The centrifuge enrichment process requires development of new materials for the high temperature operation and reliability needed for efficient operation. Multistage processing has to be demonstrated to prove feasibility.

An electromagnetic type of separation is shown in U.S. Pat. No. 2,709,222 which describes a "calutron" developed by Dr. Ernest O. Lawrence. In this instrument, a gas such as $UCl_4$ or $UF_6$ is fed into an electric arc chamber where the gas is ionized by electron bombardment to form a plasma. Ions are extracted from this plasma through a slit and accelerated by a high voltage electrode. The ion current is limited by the width of the slit and the applied voltage. This ion source is installed in an evacuated container positioned between the poles of an electromagnet. The ions emerging from the source travel in circular orbits through an angle of 180° to collectors also within the magnetic field. Since the ions of the isotopes have slightly different masses, the orbital radii for the isotopes will be different permitting separation at the collectors provided that the orbital radii are sufficiently large such that the dispersion is greater than the beam spread at the collector surface.

While some of the prior art processes have been utilized in the separation of isotopes and theoretically all of them can be used, they all have disadvantages which cause them to be relatively expensive and relatively inefficient.

Accordingly, it is an object of the present invention to provide a new and improved method and apparatus for separation of materials which does not require chemical additives such as catalysts nor excitation by photons such as from a laser nor any mechanical motion. A further object is to provide a new and improved electromagnetic separation system utilizing an efficient ion source capable of producing large currents from a very narrow liquid surface rather than a relatively broad plasma surface. A particular object is to provide such a separator which is small and economical to construct relative to present separators and which requires less power to operate.

SUMMARY OF THE INVENTION

The apparatus for separating materials includes an ion source and ion collectors mounted in a vacuum container. The source includes a supply of the materials in liquid form and means for delivering the liquid to a small outlet opening, with an intense electric field at the opening producing ions by field emission at relatively low temperature. The apparatus includes an arrangement for directing a beam of the emitted ions along a path into a transverse magnetic field which deflects the ions along paths of different radii depending upon the ion masses, resulting in two diverging beams directed toward the two collectors. The magnetic field requirements are relatively small resulting in economy in the cost of construction and operation of the separator.

In the method of separation, the materials to be separated are liquified, typically by melting, and a beam of singly charged positive ions is generated from the liquid by field emission. This beam of ions is directed into a transverse magnetic field which deflects the ions along two divergent paths. The heavier ions tend to concentrate along one of the paths and the lighter ions along the other path, with the two beams of ions being separately collected providing the desired separation.

BRIEF DESCRIPTION OF THE DRAWINGS

FIG. 1 is a plan view of an electromagnetic separator incorporating an embodiment of the invention;

FIG. 2 is a plan view similar to that of FIG. 1 and incorporating the presently preferred embodiment of the invention;

FIG. 3 is a sectional view through the ion source of the instruments of FIGS. 1 and 2;

FIG. 4 is an enlarged partial view of the source of FIG. 3;

FIG. 5 is a sectional view taken along the line 5—5 of FIG. 2 illustrating an electron source in the separator;

FIG. 5a is a view similar to that of FIG. 5 illustrating an alternative electron source;

FIG. 6 is an electrical schematic suitable for use with the separators of FIGS. 1 and 2;

FIG. 7 is a view of the outlet end of an ion source incorporating an alternative embodiment of the invention;

FIG. 8 is a sectional view taken along the line 8—8 of FIG. 7;

FIG. 9 is a view similar to that of FIG. 7 showing another alternative embodiment; and FIG. 10 is a sectional view taken along the line 10—10 of FIG. 9.

DESCRIPTION OF THE PREFERRED EMBODIMENTS

The system as illustrated in FIG. 1 includes an ion source 15, a magnet 17, a collector shield 19, and ion collectors 20, 21. The source, shield and collectors are mounted in a vacuum chamber such as a container 25 connected to a vacuum system 26. The container should be an electrical conductor and is connected to circuit ground.

The magnet 17 may be a permanent magnet or an electromagnet, and may be positioned within or externally of the container 25. The magnet may be conventional in form and produces a magnetic field which is perpendicular to the plane of the paper as viewed in FIG. 1.

A beam 28 of ions from the source 15 is directed into the magnetic field which is transverse to the beam. The magnetic field deflects the ions, with the heavier particles tending to move along the path 29 with a larger radius of curvature and with the lighter particles tending to move along the path 30 with the smaller radius of curvature. In the embodiment of FIG. 1, both the ion source and the collectors are positioned within the field of the magnet 17. However either the source or the collectors or both may be outside the field and an alternative construction is shown in FIG. 2, where components corresponding to those of FIG. 1 are identified by the same reference numerals.

The effect of the curvature of the particle paths is to bring each of the ion species to a focus at the plane occupied by the collector shield 19 as shown in FIG. 1 and FIG. 2. The heavier ions pass through aperture 34 to the collector 20 and the lighter ions pass through aperture 35 to the collector 21. Typically the collectors are carbon cups. Collected material is removed from the collectors by conventional methods.

A bombardment or plasma ion source has been utilized in the past for producing ions of uranium isotopes for electromagnetic separation. However this ion source has been unsatisfactory for a number of reasons. Undesired doubly and triply ionized atoms and a wide variety of molecular ions are generated in the source as well as the desired singly ionized atoms. This results in a serious power loss. A large portion of the output from the source is neutral rather than ionized creating high voltage sparking problems. Neutral uranium mixed with sputtered materials from the source and electrodes results in a buildup of material around the accelerating electrodes which limits running time. The cathode of the ion source erodes rapidly providing another limit to running time. The source must be positioned within the magnetic field. While the prior art system has been utilized for separation of uranium isotopes, it has been expensive, inefficient and unstable.

The present invention utilizes a liquid metal ion source which may be positioned in or outside the magnetic field, which may be quite small and which provides precise control of material flow.

This type of ion source is sometimes referred to as an electrohydrodynamic source, and a preferred embodiment is shown in FIGS. 3 and 4. A piece 38 comprising a mixture of the materials to be separated is positioned in a container 39. Typically the piece could be a vacuum cast annulus of the feed materials which permits minimum contamination of the starting material. A tube 40 is positioned in the container 39, with the lower end of the tube opening into a sump 41. A hollow needle or capillary 42 carried at the upper end of the tube 40 provides an outlet opening 43 adjacent an apertured electrode 44. The piece 38 is melted, typically by means of an electrical resistance heater 47 attached to the container 39 by a high temperature braze material or other suitable means. A controllable gas source 48 is connected to the container 39 via line 49 providing a pressure for forcing the liquid material up the tube 40. The rate of flow of the liquid material is readily controlled by adjusting the gas source.

The container 39 preferably is enclosed in a housing 53 filled with thermal insulation which substantially reduces heat transfer from the source.

A power supply 52 is connected across the electrode 44 and the container 39, providing an intense electric field at the outlet opening 43. Typically the applied voltage is in the order of four to five thousand volts.

In operation, the interaction of intense electrostatic stresses with surface tension forces results in a dynamic process at the surface of the charged liquid at the outlet opening 43. The charged liquid meniscus is forced outward from the tip of the needle forming a sharply peaked cone. Near the apex of the cone, the electrostatic field is sufficiently high to extract ions by field emission. For further information on the operation of an electrohydrodynamic ion source, see the article by John F. Mahoney, et al entitled Electrohydrodynamic Ion Source appearing in Journal of Applied Physics, Volume 40, No. 13, 5101–5106, December, 1969, which describes the production of cesium ions for a cesium engine.

The positive ions emerging from the tip of the needle 42 tend to follow divergent paths and it is preferred to provide an electrostatic lens adjacent the needle tip for controlling the divergence. Additional apertured electrodes 54, 55 are positioned above the electrode 44, with the electrode 55 connected to the electrode 44 and with the electrode 54 connected to another power supply 56 which is variable. The ion paths can be controlled by adjusting the magnitudes of the applied voltages.

The system of the present invention permits positioning the ion source and the collectors outside the magnetic field with the result that a relatively small magnetic structure may be used. Although a 90° bend is shown in FIG. 2, any angle is feasible. The smaller the angle the less magnetic field area is required for a given curvature and given separation between collectors. However, a small angle results in a larger vacuum system and 90° appears approximately optimum.

In electromagnetic separators utilizing large currents, the ion space charge must be neutralized by electrons or negative ions to prevent spreading of the beam. Because the system of the present invention involves relatively large currents at relatively low voltages, a neutralizer device must be provided as a source of electrons. In the embodiment of FIG. 5, a thermionic emitter electrode 65 is mounted on an insulator on an inner wall of the container 25. One or more collector electrodes 66 are positioned within the container outside the region traversed by the ion beam which region is indicated by the dashed line rectangle 67. A magnetic field is provided transverse to the beam and this magnetic field may be the field produced by the magnet 17 or by a separate magnetic source as desired. A power supply 69 is connected across the electrodes 65, 66.

The electrons emitted by the electrode 65 are accelerated by the collector electrodes 66. The electrons travel in the direction of the magnetic field in tightly coiled helical paths 70. The electrons come to rest before reaching the opposite wall of the container and under the influence of the electrostatic field of the collector electrodes, the electrons reverse their paths. The confinement by the magnetic field insures that the electrons have a substantial lifetime in the ion beam before they finally drift to and are collected by the collector electrodes. The presence of the electrons in the ion beam substantially reduces the adverse effects of space charge, providing the desired space charge neutralization.

An alternative embodiment for space charge neutralization is illustrated in FIG. 5a. An ultraviolet light source, typically an ultraviolet lamp 72 mounted within the container 25, illuminates an inner wall of the container 25 to produce photo electrons. The operation with the photo electrons is the same as described previously with the thermionic electrons.

In the prior electromagnetic separator, the beams of ions arrived at the collectors with the full energy imparted by the electrical acceleration. This high energy impact at the collectors produced sputtering and heat and there was a substantial cooling requirement for the collectors. Also, there was a high power consumption in this system. An arrangement for extracting the ion energy before collection is utilized in the present invention permitting a substantial reduction in accelerating power supply requirements and sputtering and heating at the collectors.

A preferred embodiment is shown in FIG. 6 with the high voltage supply 52 connected across the ion source 15 and container 25. Since this power supply does not directly involve the ion beam 28, there normally is no current flow and the power dissipation is negligible. Another power supply 75 is connected between the source 15 and the collector 20 where most of the ions are received. The supply 75 is a relatively low voltage supply, typically 500 volts. The beam current is provided by this power supply, which represents a substantial reduction in energy requirements. The values given for the voltage levels are for example only and various voltage levels can be utilized as desired. Current meters may be provided in each line for indicating current consumption.

A single needle capillary is shown for the source in FIGS. 3 and 4. Larger total ion currents can be obtained by other configurations, and two such configurations are shown in FIGS. 7-10. In the embodiment of FIGS. 7 and 8, a needle or nozzle 42' with a linear slit is fed by the tube 40, with the electrode 44' having a corresponding slot 77. In the embodiment of FIGS. 9, 10, a linear array of the needles 42 is utilized.

The system of the present invention is particularly suited for efficient separation of isotopes of heavy metals, such as separation of U235 from U238. The system may also be used for separation of isotopes of elements which are electrically conductive when in the liquid state, such as silicon and germanium. The energy requirements for the system of the invention are projected to be substantially less than the energy requirements for other separation systems and this is a major factor where large quantities of material have to be handled in order to obtain the desired result. Also, the system provides for collection of substantially 100% of U235 in a single stage separation with a facility which can be relatively small and which can utilize a low grade ore or a starting mixture with a low percentage of the desired material.

We claim:

1. In an apparatus for separating materials, the combination of:
   a container;
   a source mounted in said container for producing a first beam of positive ions of the materials to be separated, said source including
   means providing a supply of said materials in liquid form,
   means defining an outlet opening,
   means for delivering the liquid materials to said outlet opening, and
   means providing an electric field at said outlet opening for producing field emission of ions from said liquid;
   first and second ion collectors mounted in said container;
   magnet means providing a magnetic field transverse to said first ion beam deflecting said ions along paths of different radii producing second and third ion beams directed to said first and second collectors, respectively;
   means for introducing electrons into the positive ion beam; and
   means for connecting a vacuum system to said container.

2. An apparatus as defined in claim 1 wherein said source is positioned within said magnetic field of said magnet means.

3. An apparatus as defined in claim 1 wherein said source is spaced from said magnet means outside said magnetic field.

4. An apparatus as defined in claim 3 wherein said collectors are spaced from said magnet means outside said magnetic field providing an ion drift space between said magnet means and said collectors.

5. An apparatus as defined in claim 1 wherein said magnet means provides about a 90° bend in said paths with said second and third beams diverging at a small angle.

6. An apparatus as defined in claim 1 wherein said magnet means is a permanent magnet.

7. An apparatus as defined in claim 1 wherein said magnet means is an electromagnet.

8. An apparatus as defined in claim 1 wherein said materials are isotopes of a metal.

9. An apparatus as defined in claim 1 wherein said materials are uranium isotopes 235 and 238.

10. An apparatus as defined in claim 1 wherein said materials are isotopes of elements conductive in the liquid state.

11. An apparatus as defined in claim 10 including a plurality of apertured electrodes in spaced relation at said outlet opening, and means for connecting said electrodes to an electric power supply to provide an electrostatic field for controlling ion beam divergence.

12. An apparatus as defined in claim 1 wherein said source comprises:
   a second container for said materials;
   means for melting said materials in said second container;
   a tube positioned in said second container with an inlet end adjacent the bottom of said second container and an outlet end projecting from said second container providing said outlet opening; and
   a line for connecting a supply of gas under pressure to said second container for forcing molten material through said tube.

13. An apparatus as defined in claim 1 wherein said source outlet opening is formed as a hollow needle.

14. An apparatus as defined in claim 1 wherein said source outlet opening is formed as an array of hollow needles.

15. An apparatus as defined in claim 1 wherein said source outlet opening is formed as a slit.

16. An apparatus as defined in claim 1 wherein said means for introducing includes an electron source within said container in said magnetic field, a collector electrode within said container, and means for connecting a voltage across said electron source and collector electrode.

17. An apparatus as defined in claim 16 wherein said electron source includes a thermionic emitter.

18. An apparatus as defined in claim 16 wherein said electron source includes an ultraviolet radiator producing photo electrons.

19. An apparatus as defined in claim 1 including a first relatively high voltage supply connected between said ion source and said container, and a second relatively low voltage supply connected between said ion source and one of said ion collectors.

20. In a method of separating materials, the steps of:
   liquifying the materials;
   generating singly charged positive ions of the materials by field emission from the liquid;
   directing a beam of the ions through a magnetic field transverse to the beam for deflecting the ions along two divergent paths;
   introducing electrons into the ion beam in a transverse magnetic field; and
   collecting the ions in the two paths.

21. The method of claim 20 including generating the ions of the beam outside the magnetic field.

22. The method of claim 20 including generating the ions of the beam within the magnetic field.

23. The method of claim 20 including the step of maintaining the magnetic field along about a 90° bend of the ions.

24. The method of claim 20 wherein said ions are generated by forcing liquid material through a capillary into an electric field.

25. The method of claim 20 including generating the electrons adjacent the ion beam by thermionic emission.

26. The method of claim 20 including generating the electrons adjacent the ion beam by photo emission.

27. In a method of separating isotopes of a heavy metal, the steps of:
   liquifying the metal;
   generating singly charged positive ions of the metal by field emission from the liquid;
   directing a beam of the ions through a magnetic field transverse to the beam for deflecting the ions along two divergent paths with the heavier isotope ions being urged toward one path and the lighter isotope ions being urged toward the other path;
   introducing electrons into the ion beam in a transverse magnetic field; and
   collecting the ions in the two paths.

28. The method of claim 27 including generating the ions of the beam outside the magnetic field.

29. The method of claim 27 including generating the ions of the beam within the magnetic field.

* * * * *